(12) United States Patent
Myrah et al.

(10) Patent No.: US 9,037,924 B2
(45) Date of Patent: May 19, 2015

(54) MANAGING OPERATION PERFORMANCE

(75) Inventors: Michael G. Myrah, Cypress, TX (US);
Balaji Natrajan, Spring, TX (US);
Shilpa B. Shrinivas, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 162 days.

(21) Appl. No.: 13/558,702

(22) Filed: Jul. 26, 2012

(65) Prior Publication Data
US 2014/0032977 A1    Jan. 30, 2014

(51) Int. Cl.
*H04L 12/24* (2006.01)
*G06F 11/34* (2006.01)

(52) U.S. Cl.
CPC ........ *G06F 11/3419* (2013.01); *G06F 2201/81* (2013.01)

(58) Field of Classification Search
CPC ............ G06F 11/3447; G06F 11/3476; G06F 11/0757; G06F 11/3452; G06F 11/3419; G06F 11/3409; G06F 11/3457; G06F 2201/87; G06F 2201/865
USPC ..................................................... 714/1–57
See application file for complete search history.

(56) References Cited

U.S. PATENT DOCUMENTS

| | | | |
|---|---|---|---|
| 6,738,933 B2 * | 5/2004 | Fraenkel et al. ............. 714/47.2 |
| 6,970,805 B1 | 11/2005 | Bierma et al. |
| 7,231,544 B2 | 6/2007 | Tan et al. |
| 7,254,525 B2 * | 8/2007 | Briggs et al. ..................... 703/23 |
| 7,269,824 B2 * | 9/2007 | Noy et al. ...................... 717/127 |
| 7,958,304 B1 | 6/2011 | Goel et al. |
| 8,555,259 B2 * | 10/2013 | Krauss .......................... 717/133 |
| 2003/0065986 A1 * | 4/2003 | Fraenkel et al. ................ 714/47 |
| 2006/0156072 A1 * | 7/2006 | Khot et al. ...................... 714/47 |
| 2007/0168571 A1 | 7/2007 | Ramsey et al. |
| 2011/0138368 A1 * | 6/2011 | Krauss .......................... 717/133 |

FOREIGN PATENT DOCUMENTS

WO    WO-2010111412    3/2010

OTHER PUBLICATIONS

Nicholas Nethercote, et al., "Building Workload Characterization Tools with Valgrind," IEEE International Symposium, Oct. 25-27, 2006, 1 page.

* cited by examiner

*Primary Examiner* — Nadeem Iqbal
(74) *Attorney, Agent, or Firm* — International IP Law Group, PLLC

(57) ABSTRACT

Systems and methods for managing operation performance are included herein. In one example, a method includes determining an operation execution time. The method also includes storing the operation execution time. Furthermore, the method includes calculating an operation performance characteristic based on the operation execution time. The method also includes determining a threshold based on the operation performance characteristic. Additionally, the method includes determining the operation execution time is above the threshold. In addition, the method includes providing a warning based at least on the operation performance characteristic and the threshold.

20 Claims, 4 Drawing Sheets

200

| 300 | Operation Identifier 302 | Average Execution Time 308 | Last Execution Time 310 | Operation Count 312 | Predetermined Warning Time 314 | Standard Deviation 316 | Dynamic Warning Count Limit 318 | Dynamic Warning Time 320 |
|---|---|---|---|---|---|---|---|---|
| 304 | 0001 | | | | | | | |
| 306 | 0002 | | | | | | | |
| | ... | ... | ... | ... | ... | ... | ... | ... |

FIG. 3

MANAGING OPERATION PERFORMANCE

BACKGROUND

Many modern computing systems include a variety of hardware components that can include internal memory devices. The internal memory devices can store software that executes commands received from applications. However, the software that executes commands for the hardware components can include errors that cause commands to take an exceptionally long period of time to execute. When applications take a longer period of time to execute, the hardware components can begin to decrease the performance of a computing system by increasing the latency of executing commands and applications.

BRIEF DESCRIPTION OF THE DRAWINGS

Certain examples are described in the following detailed description and in reference to the drawings, in which:

FIG. 3 is an illustration of an example of a table that can store information regarding the management of operation performance characteristics.

DETAILED DESCRIPTION OF SPECIFIC EXAMPLES

The techniques disclosed herein describe a method for managing operation performance. The operation performance can be managed by storing operation performance characteristics for each operation that is executed in a hardware device. The hardware device can include a Serial Attached SCSI (also referred to herein as SAS) storage device, a storage controller, an array controller, or any other suitable hardware device. The operation performance characteristics include any suitable calculation or observation of execution time of an operation or any data associated with the execution of an operation.

In some examples, the performance of an operation can be determined based on whether operations are executing in an expected amount of time. For example, a storage device, such as a SAS storage device, may include firmware that supports various operations. After the firmware is updated, an operation may take longer to execute. For example, a storage device may execute a create logical drive operation in 15 seconds instead of the expected 8 seconds. The techniques disclosed herein can detect performance deviations for any number of suitable operations and defective hardware components.

Figure 1:
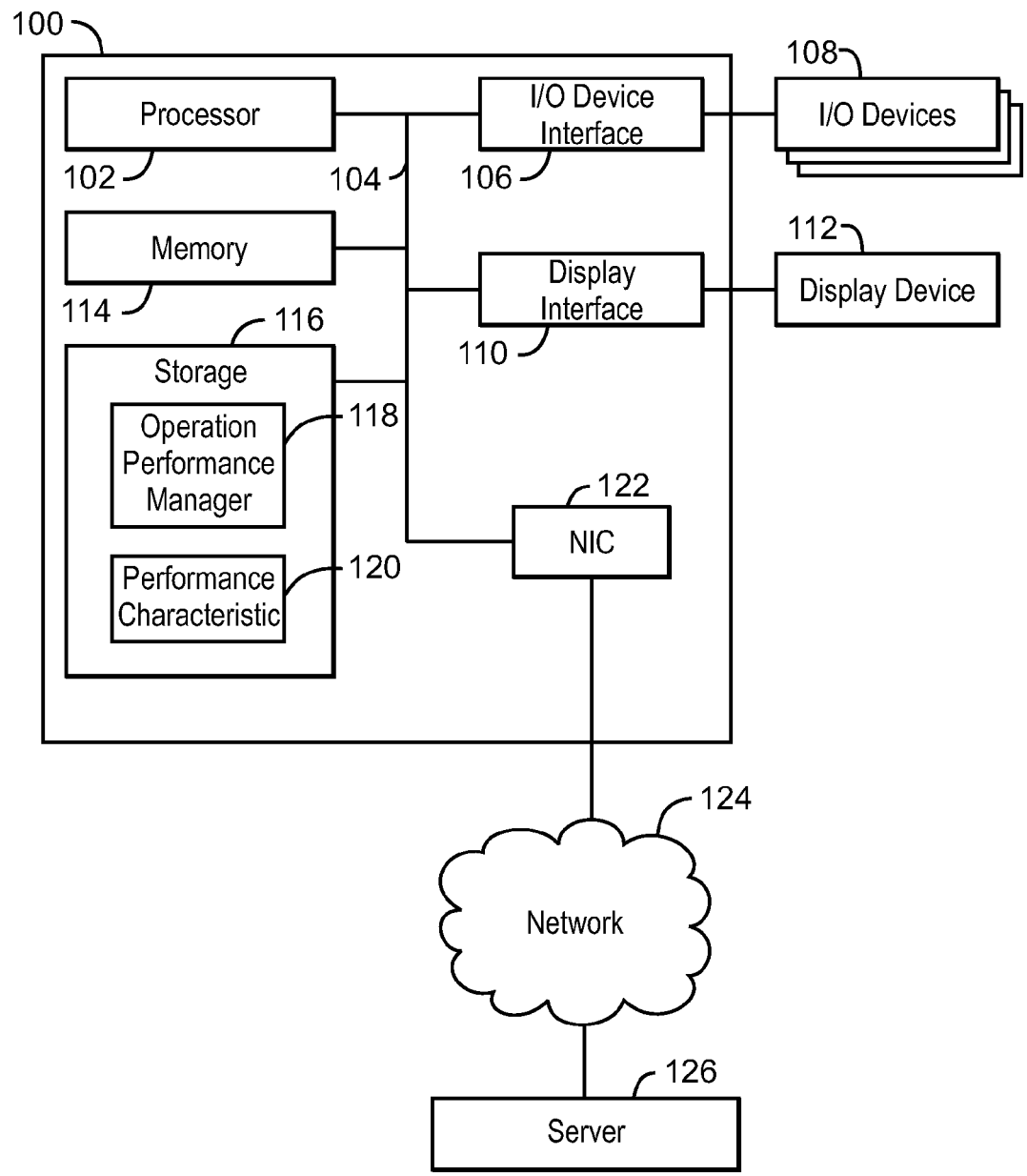
FIG. 1 is a block diagram of an example of a computing system that manages operation performance.

FIG. 1 is a block diagram of an example of a computing system 100 that manages operation performance. The computing system 100 may include, for example, a mobile phone, laptop computer, desktop computer, or tablet computer, among others. The computing system 100 may include a processor 102 that is adapted to execute stored instructions. The processor 102 can be a single core processor, a multi-core processor, a computing cluster, or any number of other appropriate configurations.

The processor 102 may be connected through a system bus 104 (e.g., PCI, PCI Express, HyperTransport®, Serial ATA, among others) to an input/output (I/O) device interface 106 adapted to connect the computing system 100 to one or more I/O devices 108. The I/O devices 108 may include, for example, a keyboard and a pointing device, wherein the pointing device may include a touchpad or a touchscreen, among others. The I/O devices 108 may be built-in components of the computing system 100, or may be devices that are externally connected to the computing system 100.

The processor 102 may also be linked through the system bus 104 to a display interface 110 adapted to connect the computing system 100 to a display device 112. The display device 112 may include a display screen that is a built-in component of the computing system 100. The display device 112 may also include a computer monitor, television, or projector, among others, that is externally connected to the computing system 100.

The processor 102 may also be linked through the system bus 104 to memory 114 that can include random access memory (e.g., SRAM, DRAM, SONOS, eDRAM, EDO RAM, DDR RAM, RRAM, PRAM, among others), read only memory (e.g., Mask ROM, PROM, EPROM, EEPROM, among others), flash memory, non-volatile memory, or any other suitable memory systems. The computing system 100 can also include a storage device 116 that can include a hard drive, an optical drive, a USB flash drive, an array of drives, a SAS storage device, or any other appropriate combinations thereof.

The storage device 116 can include an operation performance manager 118. The operation performance manager 118 can manage operation performance characteristics 120 by calculating the operation performance characteristics 120 and storing the operation performance characteristics in a storage device 116. The storage device 116 can store any suitable number of operation performance characteristics 120. The operation performance characteristics 120 can include any suitable calculation or observation of execution time of an operation or any data associated with the execution of an operation. The operation performance manager 118 can use the operation performance characteristics 120 to determine if the execution time for an operation exceeded an expected execution time for the operation. In some examples, the operation performance manager 118 may store the type of operation and use the type of operation to determine an expected execution time for the type of operation.

The computing system 100 can also include a network interface card (NIC) 122. The NIC 122 may be adapted to connect the computing system 100 through the system bus 104 to a network 124. The network 124 may be a wide area network (WAN), local area network (LAN), or the Internet, among others. The computing system 100 can send operation performance characteristics 120 to a server 126 connected to the computing system 100 through the network 124. The server 126 can collect operation performance characteristics from any suitable number of computing systems. In some example, the server 126 can also analyze the operation performance characteristics to detect errors in operations executed in hardware components, such as the storage device 116 or the NIC 120.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional memory devices, video cards, additional network interfaces, etc.). Furthermore, any of the functionalities of the operation performance manager 118 may be partially, or entirely, implemented in any suitable hardware component or in the processor 102. For example, the functionality may be implemented with an application specific integrated circuit, in logic implemented in the processor 102, in a co-processor on a peripheral device, or in a NIC 122, among others.

Figure 2:
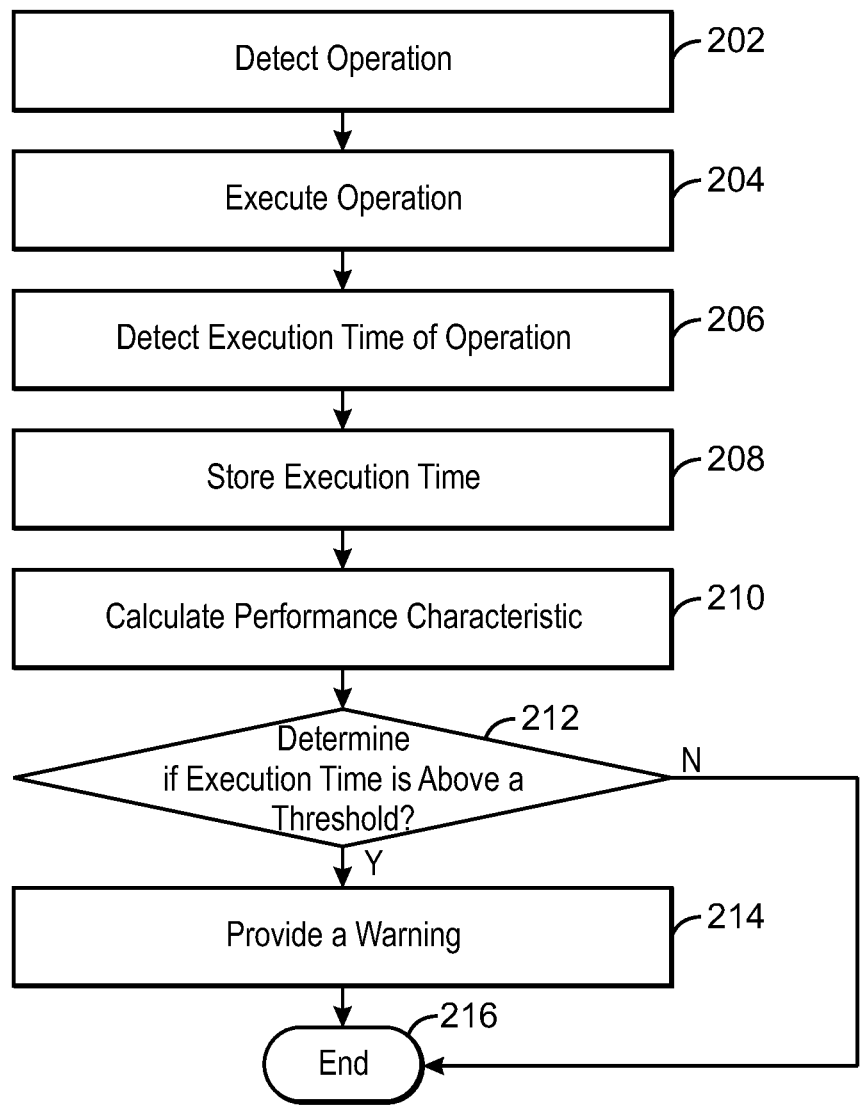
FIG. 2 is a process flow diagram illustrating an example of a method for managing operation performance.

FIG. 2 is a process flow diagram illustrating an example of a method for managing operation performance. The method 200 may be implemented with a computing system, such as the computing system 100 of FIG. 1. For example, the method 200 may be performed by the operation performance manager 118 shown in FIG. 1.

At block 202, the operation performance manager 118 detects an operation to execute. The operation can include a read operation, a write operation, or any other suitable operation. For example, the operation performance manager 118 may receive the operation from an application, or the operation may be executed in a hardware device as part of an initialization process.

At block 204, the operation performance manager 118 executes the operation. In some examples, the operation performance manager 118 can execute an operation by sending data to a processor. In other examples, the operation performance manager 118 can execute the operation within a hardware device. For example, the operation performance manager 118 may execute a read operation for a storage device by sending the read operation to a microcontroller that executes commands for the storage device.

At block 206, the operation performance manager 118 determines the execution time of the operation. In some examples, the operation performance manager 118 may determine the execution time of the operation by measuring the execution time with a timer. The operation performance manager 118 may initialize the timer as the operation performance manager 118 begins to execute a command and the operation performance manager 118 may stop the timer when execution of the command is complete. In other examples, the operation performance manager 118 may store the value of the system clock as the operation performance manager 118 begins to execute an operation. The operation performance manager 118 can then store the value of the system clock as the execution of the operation ends and calculate the difference between the two values of the system clock.

At block 208, the operation performance manager 118 stores the execution time of the operation. The operation performance manager 118 can store the execution time of the operation in a storage device, in a buffer, or in a register, among others. In some examples, the operation performance manager 118 can use the execution time of the operation to determine if an operation executed within an expected amount of time. The operation performance manager 118 can determine if the operation executed within an expected amount of time by calculating performance characteristics.

At block 210, the operation performance manager 118 can calculate an operation performance characteristic for the operation. The performance characteristic can include any suitable data value that relates to the execution properties of the operation. For example, the performance characteristic may be an average execution time, last operation execution time, operation count, predetermined warning times, dynamic warning times, dynamic warning counts, standard deviations, and the like, including any combinations thereof. For example, the operation performance manager 118 may determine the average execution time for an operation based on the number of times the operation performance manager 118 has executed an operation of a specific type and the execution time of each operation of that type. The performance characteristics are discussed in greater detail below in relation to FIG. 3. The operation performance manager 118 can store the performance characteristic in a table in storage along with an operation code that identifies a corresponding operation type for the operation.

In some examples, the operation performance manager 118 can calculate the operation performance characteristic during an idle period or a post operation procedure. For example, the operation performance manager 118 may delay calculating the average execution time of an operation until the operation performance manager 118 does not have any pending operations to execute. By calculating an operation performance characteristic during an idle period, the operation performance manager 118 may prevent an increase in latency for a hardware component. The operation performance manger 118 can prevent an increase in latency for a hardware component by executing additional operations before calculating operation performance characteristics during an idle period.

At block 212, the operation performance manager 118 can determine if the time of operation execution is above a threshold. In some examples, the operation performance manager 118 may determine a threshold based on predetermined values of expected execution times of operations. For example, the operation performance manager 118 may determine a threshold to be a predetermined expected execution time of a read command. In other examples, the operation performance manager 118 may calculate a threshold value based on an operation performance characteristic. For example, the operation performance manager 118 may calculate an average execution time of an operation. The operation performance manager 118 may also determine a threshold value based on the average execution time of an operation. For example, the operation performance manager 118 may determine the threshold value is any suitable amount of time above the average execution time. If the time of operation execution is above a threshold, the process continues at block 214. If the time of operation execution is not above a threshold, the process ends at block 216.

At block 214, the operation performance manager 118 can provide a warning based in part on the execution time of the operation and the threshold. In some examples, the operation performance manager 118 can send the warning to a diagnostic log, a user, or a server connected to the computing system. The warning can indicate the execution time of an operation exceeded a threshold value. For example, when the execution time of an operation exceeds a predetermined threshold, the operation performance manager 118 can provide a warning. In other examples, the operation performance manager 118 can provide a warning when the execution time of an operation exceeds a warning based on an operation performance characteristic. The process ends at block 216.

The process flow diagram of FIG. 2 is not intended to indicate that the method 200 is to be executed in any particular order, or that all of the steps of the method 200 are to be included in every case. Further, any number of additional steps may be included within the method 200, depending on the specific application. For example, any suitable number of the operation performance characteristics can be reset to a zero value. In some examples, the operation performance characteristics can be reset to a zero value when new software is stored in a hardware component.

Additionally, in some examples the operation performance manager 118 may send a warning to a server indicating that the execution time of an operation has exceeded a threshold value. In response to the warning, the server can implement system changes that may improve the execution time of operations. For example, the operation performance manager 118 may receive updated software from the server that prevents the execution time of an operation from exceeding a threshold value. The operation performance manager 118 may send the updated software to any suitable hardware components for installation. The operation performance manager 118 may also modify a hardware or software configuration parameter to prevent the execution time of an operation from exceeding a threshold value. In another example, the operation performance manager 118 may notify the user of degraded operation or system performance in response to the warning.

FIG. 3 is an illustration of an example of a table that can store information regarding the management of operation performance characteristics. The table 300 may be implemented in a storage device, such as storage 116 of FIG. 1. The table 300 may store any suitable number of operation performance characteristics.

In some examples, the table 300 can include an operation identifier 302. The operation identifier 302 can identify a specific operation executed by the operation performance manager 118. For example, a read command may be executed by the operation performance manager 118 and may receive an operation identifier of 0001 at block 304. Additional commands executed by the operation performance manager 118 may receive sequential operation identifiers 302. For example, a subsequent write command may receive an operation identifier of 0002 at block 306.

The table 300 can also include an average execution time 308. In some examples, the operation performance manager 118 can calculate the average execution time by determining an average of the execution times for a particular operation. The operation performance manager 118 may average each execution time of a particular operation with previous execution times of the particular operation. In some examples, one average execution time for an operation may be stored. The stored average execution time may be updated with each subsequent execution time for an operation. In other examples, an average execution time can be stored with each operation. For example, each operation may be stored in the table 300 and the average execution time for the operation can be stored. In some examples, the operation performance manager 118 can then analyze previous average execution times for an operation.

The table 300 can also include a last execution time 310. The operation performance manager 118 can determine the last execution time 310 by determining the execution time of the last instance of an operation. For example, the operation performance manager 118 can execute a read operation. The operation performance manager 118 can then detect the execution time of the previous read operation.

The table 300 may also contain a column for operation count 312. The operation count 312 may increase each time an operation of a certain type is executed. For example, each time a write operation is executed, the operation count 312 for the write operation can be incremented by 1. In some examples, an operation count 312 may be associated with a particular operation identifier. For example, the operation identifier 302 at block 304 may correspond to a read command. The operation performance manager 118 may increase the operation count 312 that is associated with the operation identifier 302 each time a read command is executed.

The table 300 may also include predetermined warning times 314. The predetermined warning times 314 may be determined by a manufacturer, software developer, or a user, among others. The predetermined warning time 314 can refer to a maximum amount of time expected to execute a particular operation. For example, a read operation may have a predetermined warning time equal to a maximum execution time of 10 ms. If any read operation takes longer than 10 ms to execute, the operation performance manager 118 may generate a warning.

The table 300 may also include a column for standard deviations 316. In some examples, the operation performance manager 118 may calculate and store a standard deviation 316 based on the average execution time for each operation. For example, the standard deviation 316 may be calculated according to Equation 1.

$$\sigma = \sqrt{\frac{\sum (x - \bar{x})^2}{N}} \qquad (1)$$

In Equation 1, σ represents the standard deviation, x represents the execution time of an operation, x̄ represents the average execution time of a type of operation, and N represents the operation count 312.

The table 300 can also include a dynamic warning count limit 318. The dynamic warning count limit 318 can indicate when to generate a warning based on the dynamic warning time 320 instead of a predetermined warning time 314. For example, once the operation count 312 for an operation increases beyond any suitable number, a dynamic warning time 320 may be used by the operation performance manager 118 to generate a warning instead of the predetermined warning 314. In one example, the operation performance manager 118 may set the dynamic warning count limit 318 equal to fifteen. The operation performance manager 118 may use a predetermined warning time 314 during the first 14 instances of execution of an operation to determine if the execution time of an operation has exceeded a threshold value. The operation performance manager 118 may then use a dynamic warning time 320 as a threshold value for any execution of the operation beyond fifteen times.

The dynamic warning time 320 may be automatically adjusted by the operation performance manager 118 based on an operation performance characteristic. In some examples, the dynamic warning time 320 may indicate when the execution time of an operation is beyond a threshold. For example, the dynamic warning time 320 may represent when the execution time of an operation is beyond any suitable number of standard deviations from the average execution time for a type of operation. The operation performance manager 118 may store a dynamic warning time 320 that is equal to three standard deviations from the average execution time for a particular operation. In some examples, the dynamic warning time 320 may represent a percentage of the average execution time for a particular operation. For example, the dynamic warning time 320 may be 25%, which can indicate any execution times for an operation above 25% are above a threshold value. As discussed above, the dynamic warning time 320 can be sent to a diagnostic log, a user, or a remote server for evaluation. In some examples, a diagnostic log can store each operation that has an execution time beyond a threshold value.

The illustration of FIG. 3 is not intended to include all data that may be stored in a table 300 managed by the operation performance manager 118. Any suitable number of columns of data may be stored in the table 300 depending on specific application. For example, an additional column that stores the average execution time for operations of all types may also be stored in table 300.

Figure 4:
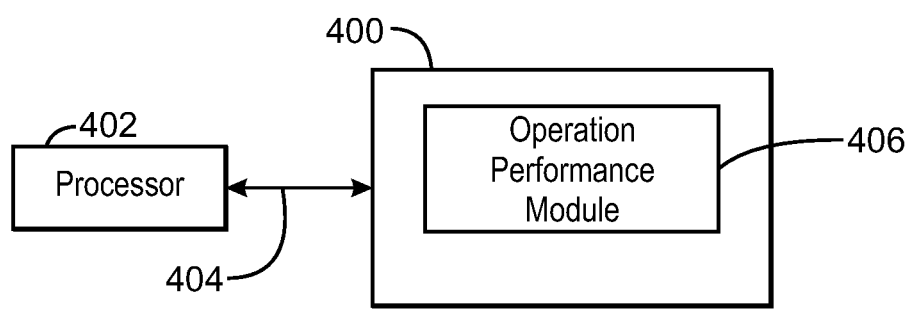
FIG. 4 is an example of a tangible, non-transitory computer-readable medium that can manage operation performance.

FIG. 4 is a block diagram showing a tangible, non-transitory, computer-readable medium 400 that can manage operation performance. The tangible, non-transitory, computer-readable medium 400 may be accessed by a processor 402 over a computer bus 404. Furthermore, the tangible, non-transitory, computer-readable medium 400 may include code to direct the processor 402 to perform the current method.

The various software components discussed herein may be stored on the tangible, non-transitory, computer-readable medium 400, as indicated in FIG. 4. For example, an operation performance module 406 may be adapted to direct the processor 402 to manage operation performance characteristics. It is to be understood that any number of additional software components not shown in FIG. 4 may be included within the tangible, non-transitory, computer-readable medium 400, depending on the specific application.

The present examples may be susceptible to various modifications and alternative forms and have been shown only for illustrative purposes. Furthermore, it is to be understood that the present techniques are not intended to be limited to the particular examples disclosed herein. Indeed, the scope of the appended claims is deemed to include all alternatives, modifications, and equivalents that are apparent to persons skilled in the art to which the disclosed subject matter pertains.

What is claimed is:

1. A method for managing operation performance comprising:
   determining an operation execution time in a hardware device;
   storing the operation execution time;
   calculating an operation performance characteristic based on the operation execution time;
   determining a threshold based on the operation performance characteristic;
   determining the operation execution time is above the threshold; and
   providing a warning based at least on the operation execution time and the threshold.

2. The method of claim 1 comprising sending the warning to a server.

3. The method of claim 1, wherein the operation performance characteristic comprises an average time, a last operation time, an operation count, a predetermined warning time, a dynamic warning time, or a standard deviation value.

4. The method of claim 1, wherein the operation performance characteristic comprises a dynamic warning value that is automatically adjusted based on the operation execution time.

5. The method of claim 4, comprising:
   calculating an average execution time for an operation of a first type;
   calculating a standard deviation value based on the average execution time; and
   calculating the dynamic warning value based on the standard deviation value.

6. The method of claim 1, wherein providing the warning comprises:
   detecting a threshold based on a predetermined warning or a dynamic warning; and
   detecting an operation performance characteristic value is above a threshold.

7. The method of claim 1 comprising sending the warning to a diagnostic log.

8. A system for managing operation performance comprising:
   a storage device comprising an operation performance manager to manage an operation performance characteristic; and
   a processor to:
   determine an operation execution time;
   store the operation execution time;
   calculate the operation performance characteristic based on the operation execution time;
   determine a threshold based on the operation performance characteristic;
   determine the operation execution time is above the threshold; and
   provide a warning.

9. The system of claim 8, wherein the processor is to send the warning to a server.

10. The system of claim 8, wherein an operation performance characteristic comprises an average time, a last operation time, an operation count, a factory warning value, a dynamic warning value, or a standard deviation value.

11. The system of claim 10, wherein the operation performance characteristic comprises a dynamic warning value that is automatically adjusted based on the operation execution time.

12. The system of claim 11, wherein the processor is to:
    calculate an average execution time for an operation of a first type;
    calculate a standard deviation value based on the average execution time; and
    calculate the dynamic warning value based on the standard deviation value.

13. The system of claim 8, wherein the processor is to receive a software update from a server in response to sending the warning to the server.

14. The system of claim 8, wherein the processor is to send the warning to a diagnostic log.

15. A tangible, non-transitory computer-readable medium comprising code to direct a processor to:
    determine an operation execution time in a hardware device;
    store the operation execution time and an operation identifier;
    calculate an operation performance characteristic based on the operation execution time; and
    provide a warning based at least on the operation performance characteristic.

16. The tangible, non-transitory computer-readable medium of claim 15, wherein the code is to direct a processor to send the warning to a server.

17. The tangible, non-transitory computer-readable medium of claim 15, wherein an operation performance characteristic comprises an average time, a last operation time, an operation count, a factory warning value, a dynamic warning value, or a standard deviation value.

18. The tangible, non-transitory computer-readable medium of claim 17, wherein the operation performance characteristic comprises a dynamic warning value that is automatically adjusted based on the operation execution time.

19. The tangible, non-transitory computer-readable medium of claim 18, wherein the code is to direct the processor to:
    calculate an average execution time for an operation of a first type;
    calculate a standard deviation value based on the average execution time; and
    calculate the dynamic warning value based on the standard deviation value.

20. The tangible, non-transitory computer-readable medium of claim 15, wherein the code is to direct the processor to:
    detect a threshold based on a predetermined warning or a dynamic warning; and detect an operation performance characteristic value is above a threshold.

* * * * *